(12) United States Patent
Terao et al.

(10) Patent No.: US 7,263,053 B2
(45) Date of Patent: Aug. 28, 2007

(54) INFORMATION RECORDING METHOD AND INFORMATION RECORDING APPARATUS

(75) Inventors: Motoyasu Terao, Hinode (JP); Katsuhiko Yamaguchi, Hachioji (JP); Tadao Ino, Hino (JP); Kyoko Kojima, Kunitachi (JP); Harukazu Miyamoto, Higashimurayama (JP); Takeshi Maeda, Koganei (JP); Yuko Tsuchiya, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 516 days.

(21) Appl. No.: 10/817,863

(22) Filed: Apr. 6, 2004

(65) Prior Publication Data
US 2005/0007936 A1    Jan. 13, 2005

(30) Foreign Application Priority Data
Apr. 8, 2003    (JP)    ............................. 2003-103538

(51) Int. Cl.
*G11B 7/00*    (2006.01)
(52) U.S. Cl. ...................................... 369/100; 369/276
(58) Field of Classification Search ............. 369/44.15, 369/100, 126, 44.14, 276
See application file for complete search history.

(56) References Cited

U.S. PATENT DOCUMENTS 6,977,883 B2 *   12/2005   Terao et al. ................. 369/276

2003/0218941 A1    11/2003   Terao et al. ............. 369/13.01

FOREIGN PATENT DOCUMENTS

| JP | 2000-54012 | 2/2000 |
| JP | 2001-344807 | 12/2001 |
| JP | 2003-346378 | 12/2003 |

OTHER PUBLICATIONS

Sun, et al., "Polymer Mediated Self-Assembly of Magnetic Nanoparticles", J. Am. Chem. Soc., vol. 124, No. 12, 2002, pp. 2884-2885.

* cited by examiner

*Primary Examiner*—Nabil Hindi
(74) *Attorney, Agent, or Firm*—Antonelli, Terry, Stout & Kraus, LLP.

(57) ABSTRACT

An information recording method and information recording apparatus is capable of resolving the trade-off relation between recording density and transmittance, wherein either the reproduction (playback) signal quality or the recording sensitivity is lowered. For this purpose, a voltage is applied by way of ball bearings or slip rings to a specified layer of a medium having multiple layers. The light transmittance of the recording layer is changed by application of this voltage. The tradeoff relationship between recording density and transmittance is eliminated thereby, and the recording density and transmittance levels are both improved, so as to enhance the recording reliability.

18 Claims, 9 Drawing Sheets

INFORMATION RECORDING METHOD AND INFORMATION RECORDING APPARATUS

CLAIM OF PRIORITY

The present application claims priority from Japanese application JP 2003-103538, filed on Apr. 8, 2003, the content of which is hereby incorporated by reference into this application.

CROSS-REFERENCE TO RELATED APPLICATION

This application is related to U.S. application Ser. No. 10/763,274, filed on Jan. 26, 2004, the disclosure of which is hereby incorporated by reference.

FIELD OF THE INVENTION

The present invention relates to an information recording method and an information recording apparatus for recording information using light.

BACKGROUND OF THE INVENTION

An optical disk possesses great advantages in that the recording medium, in the form of a disk, can be removed from the recording/reproduction device, and the recording medium is inexpensive. Therefore, optical disk devices preferably require the advantages of high speed and high recording density without losing the features of disk removability and low cost.

To record information on a magnetic disk or magneto optical disk (MO), the magnetic head is brought near the recording medium. However, during high density recording, the magnetic head is preferably separated from the recording medium as much as possible to achieve high speed.

The principle of irradiating light onto a recording layer to record information is well known. The process has the advantage that an information recording medium is obtained which is capable of being rewritten many times, utilizing a phase change (also called phase transition) in the material that changes the arrangement of the atoms using heat. In the method disclosed in JP-A No. 344807/2001, for example, the basic structure of such a phase-change optical disk is composed of a protective layer formed over a substrate, a recording layer (or film), such as a GeSbTe alloy, another protective layer, and a reflective layer. A multilayer phase-change optical disk of up to four layers is reported to be currently under development.

On the other hand, optical disks utilizing organic material, which are used as a CD-R and DVD-R disk, have been produced for practical commercial use. These disks comprise a recording layer containing pigments that absorb the light wavelengths of the recording light source. Recording is performed on these disks by irradiating a laser light to induce a change in the material on the substrate surface in contact with that recording layer.

Besides a magnetic disk formed of a thin magnetic film, a method was also disclosed utilizing fine magnetic particles, such as FePt, in [Patent document 1] JP-A No. 344807/2001. The medium based on this method preferably has multiple layers for increasing the effective recording density (effective surface density). However, at three or more layers, the transmittance ratio and the recording sensitivity have a tradeoff relationship (one improves while the other becomes worse), so that one of either the reproduction signal quality or the recording sensitivity is sacrificed (becomes worse) at the expense of the other.

SUMMARY OF THE INVENTION

The present invention has the object of resolving the above-described problems by providing an information recording method and information recording apparatus that achieves stable, large-capacity, maximum-speed recording.

To achieve the foregoing object, the present invention is structured as will be described next.

The device, first of all, contains a rotating shaft, and a part that slides or rolls is installed in the vicinity of that shaft for supplying a voltage from the stationary section of the recording/reproduction device to the rotating disk.

The sliding part is, for example, a slip ring composed of a metal ring and a spring. A variation thereof is an electrode inserted in a pool of mercury fluid. However, there are restrictions on possible applications in the case of a slip ring, since friction (wear) occurs that limits its speed of rotation and service life. In the case of the pool of mercury fluid, installing a rotating shaft is difficult because high torque is required due to the seal for mercury, and installing multiple shafts in series is also difficult, so that the possible applications are limited.

The rolling part may be a sphere, rod, cylinder or a similar shape. The rolling part therefore preferably has a smaller rolling diameter than the mounted portion of the rotating shaft. The voltage transmission means comprising these parts is installed in the device. Of course, this voltage transmission means may also be used to supply electrical current to the recording medium by way of the rotating shaft. One example of such a means is the ball bearing shown in plan view in FIG. 1. In the case of a ball bearing, the friction is reduced by the rotation of multiple spheres (balls) or cylinders between a rotating inner race (grooved circle) and a stationary outer race (grooved circle). However, at times, there is no electrical conduction from the outer race to the inner race. In any event, a voltage is slowly applied when the recording medium has a large electrical capacity. However, in order to speedily and swiftly raise the voltage, the lubricant material used in the ball bearing should preferably be electrically conductive. A solid lubricant or even a grease lubricant may be used as the electrically conductive material. Electricity can be constantly conducted by mixing silver and carbon particles into the grease, for example.

Multiple electrodes are installed in the vicinity of the rotating shaft of the disk motor or the section in the vicinity of the disk center hole on the disk-bearing component installed in the rotating shaft. A means is installed for positioning these electrodes at each specified position in the vicinity of the disk center hole; and a means is installed for the electrodes on the rotating shaft side to make direct or indirect contact by way of another object (with the disk side electrodes) for use when the disk is loaded. In this way, a specified voltage can be applied to each electrode. The disk side electrodes may be installed in a ray shape or a concentric shape. The corresponding electrodes on the rotating shaft side may be a segmented, circular arc shape or a concentric (coaxial) shape.

If protrusions or cavities are formed with a taper on their upward/downward side, on at least one location on the side of the component receiving the disk installed on the rotating shaft or the rotating shaft 9 (of the disk motor) that the ball bearings (only inner races 6, 7, and 8 are shown) in FIG. 2 are mounted on, then the electrodes can be positioned along the disk rotation direction and electricity can be accurately supplied to multiple layers. The reference numerals 3, 4, and 5 in the figure denote the means for supplying electrical current to the disk.

When a ball bearing with electrically conductive grease is used, as shown in FIG. 3, a stable supply of voltage with a fluctuation of approximately 10 percent can be applied as the resistive load. The disk possesses the same properties as a large condenser, so that a smooth supply of electrical current can be expected.

Multiple recording layers are utilized as the medium. More specifically, thin aluminum reflective films 11, first of all, are laminated onto the substrate 10. Next, a first electrode 12, an electrochromic material layer 13 (includes an electrolytic material and ion transmittance control layer for both layer boundaries) and a second electrode (transparent electrode) 16 are repeatedly formed in order as laminations. Preferably, a unidirectional voltage is applied across the electrodes enclosing the recording layer to increase the laser light absorption ratio for reading and writing. Therefore, only the desired (target) layer absorbs light, and there is almost no absorption of light by other layers. This eliminates interference from other layers, so that all layers are formed at a depth within the focal point of the focusing lens, and multiple large-capacity (capacitance) layers can be formed using a multiple layer disk. Of course, the focus point position may be moved and recording/reproduction performed without some layers being within the depth of the focal point. In this case multiple laminated layers may cause the pits and grooves, that express the address information, to become deformed; however, the layer can sometimes be reformed with these pits and grooves transferred onto it, and the address for at least a portion of the layer with the focal point depth at the new focal point position can be read. When the optical heads of two laser beams can be utilized, the focal point of one beam can be focused on the reflective layer, and its beam spot fixed at a position relative to the plane (surface) of the disk, and the other beam may be focused on another layer.

The electrochromic material is, for example, a polymer of organic molecules of oxidized tungsten or thiophene. The electrochromic material may contain electrolytic material, and it may contain layers of a material for direct coloring (per changes in absorption spectra) within the normal definition by application of a voltage (electrical current flows). The electrochromic material may also contain a region to emit light by applying a voltage (electrical current flows) and to include layers to receive light from that region and colors or to eliminate colors.

The sensitivity of the recording medium during recording can be adjusted by applying a voltage. A voltage may be applied to at least two electrodes simultaneously, or it may be applied repeatedly in sequence as pulses among the multiple electrodes on the recording medium. Applying this voltage is required when using a material whose color changes, unless a low voltage is applied to maintain the color.

The recording medium may utilize multiple recording layers with a voltage applied across multiple electrodes. However, a voltage different from the voltage on those electrodes may be applied across only those electrodes on both sides of the layers that are performing recording (writing), or erasure or reading operations.

The effect of the present invention is rendered at a recording density (track pitch, bit pitch) on a 2.6 gigabyte DVD-RAM or higher. The effect of the present invention is even further enhanced on a DVD-RAM with a recording density of 4.7 gigabyte or higher. When the wavelength of the light source is not within the vicinity of 660 nm or the NA of the focusing lens is not 0.6, then the effect of the invention is rendered at this recording density or higher calculated per the wavelength ratio or NA (number of apertures) ratio radially or peripherally along the disk.

In accordance with the present invention, sections with grooves forming concave portions on the substrate are called groups. The section between groups is called a land. When light is irradiated onto a groove by way of the substrate, the group appears as a protrusion when view from the side on which the light is input. However, when the light is input from the side opposite the substrate, then the protrusion as seen from the light input side forms a land. Whether recording on only the land or only on the group in so-called in-group recording, this recording on the protrusion as seen from the light input side in most cases yields good recording characteristics whether the light is input from the substrate side or from the opposite side. However, recording may also be performed on the concavities as seen from the light input side, since the difference in recording characteristics is not significant.

The invention therefore eliminates the effects that result in the problem of a tradeoff relationship (in other words a loss) in either the transmittance ratio or recording sensitivity of each layer, and so a satisfactory transmittance ratio and recording sensitivity are both achieved. If the mechanism for transmitting the voltage is of a wheel type or is ball bearings, then the structure will be small and the friction will be a rolling type friction, so that the torque will be small and efficient, and there will be little wear, so that a long service life is achieved. Further, if electrically conductive grease is used in the rolling section, then the voltage fluctuations will be small and the supply of voltage will be stable.

DETAILED DESCRIPTION OF THE PREFERRED EMBODIMENTS

First Embodiment (Structure and Manufacturing Method)

Figure 4:
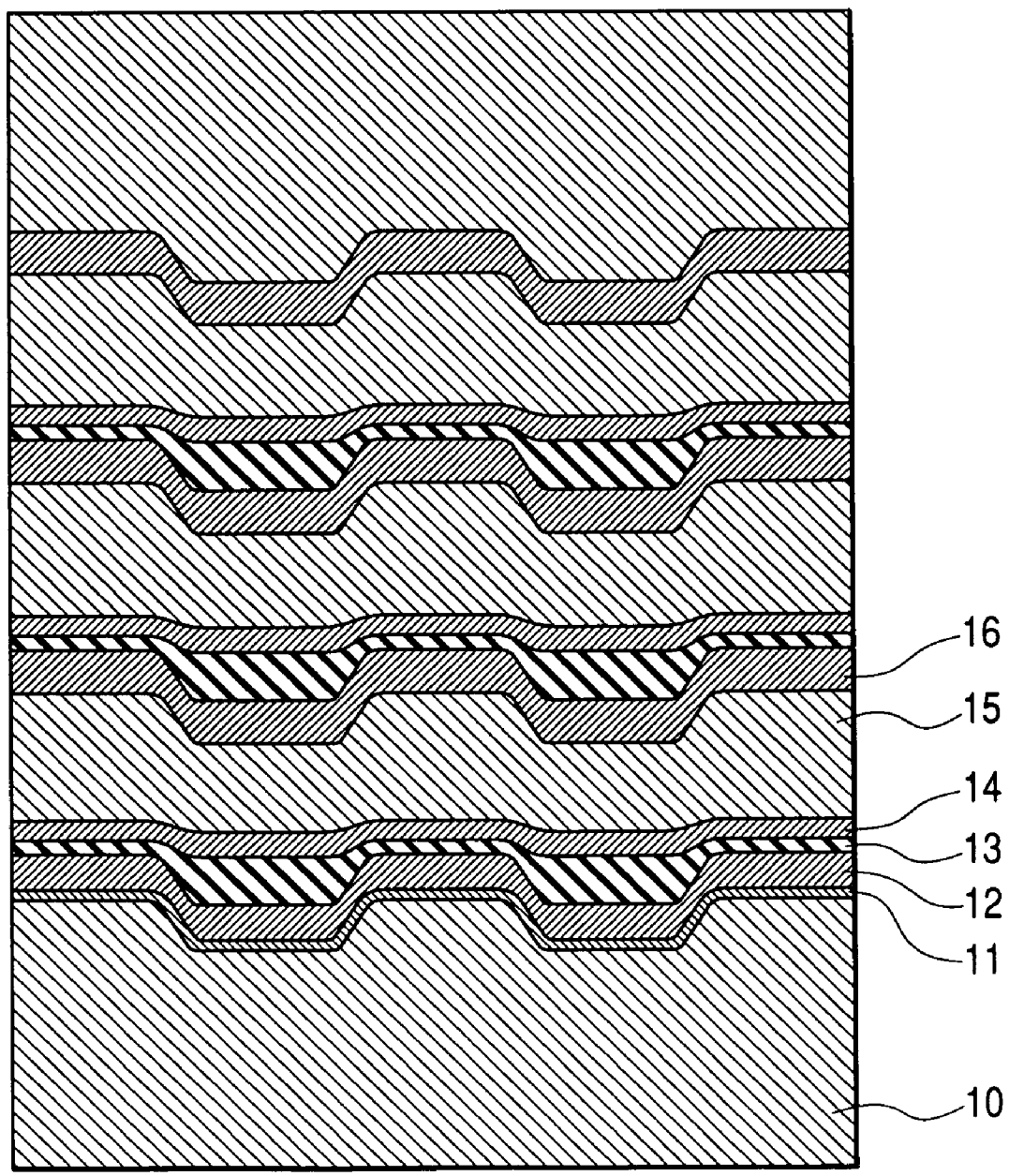
FIG. 4 is a cross sectional view showing the structure of the recording medium of the present embodiment.

The recording medium of the present embodiment, as shown in FIG. 4, contains an in-groove-recording type tracking groove with a depth of 60 nanometers and width of 0.35 microns at a track pitch of 0.74 microns on the surface of a substrate with a thickness of 0.6 mm and a diameter of 12 centimeters. This medium holds address information as wobbles on the above-mentioned groove. On the substrate, a semi-transparent reflective layer 11 of $Ag_{94}Pd_4Cu_2$ was formed. Then an ITO transparent electrode 12, an electrochromic material layer 13, an ion pass control layer 14, a solid electrolytic layer 15 and an ITO transparent electrode 16 are formed; and, from there onwards, it contains two repeated laminations of layer 12 through layer 16. Two adjacent ITO transparent electrodes can be unified into one layer. Finally, a plastic layer hardened by ultraviolet rays is coated on the topmost surface.

The electrochromic material layer utilizes polythiophene as the coloring material. A solid electrolytic material layer is then laminated onto an ion pass control layer formed over the electrochromic material layer. This ion pass control layer obstructs the passage of ions resulting from irradiation by the laser beam. This ion pass control layer has the function of maintaining the recording status by changing, after laser beam irradiation, to suppress the passage of ions with loss of the coloring function due to heating in the electrochromic material layer. This electrochromic material layer is formed by spin coating, so that the film will become thin on the land section and will become thick on the groove sections. This electrochromic layer colors when a voltage is applied across the electrodes above and below the electrochromic material layer. Each layer is formed by coating or by sputtering, and the light is input from above.

Materials capable of being used in the electrochromic material layer are organic materials, such as polymers and oligomers of thiophene organic material, and $WO_3$. Electrically conductive organic material is especially preferable. The wavelength of the laser light is 660 nanometers and the track pitch is 0.6 micrometers. The thiophene polymer is formed by vacuum deposition or by electrolytic polymerization. This electrolytic polymerization utilizes a thiophene derivative called poly(3-methylthiophene) as the monomer; and, it utilizes $LiBF_4$ as the fixer, and benzonitryle as the solvent.

The layer structure is comprised of a solid electrolytic layer of material composed of a mixture of plasticizer, Li trifluorate (full name is Li trifluorometanesulfonate: $CF_3SO_3Li$) in an acrylic type ultraviolet hardened resin, and a PEDT/PSS layer. In other words, it is made up of two layers of electrically activated electrically conductive polymer material formed from a mixture of poly (3,4 etylenedioxythiophene) and poly (stylene sulfonate).

The advantages obtained from using an organic material layer of this type are that it is electrically conductive and that the electrical conductivity ratio becomes higher as the temperature rises. Other advantages are that the material also has photo-conducting properties so that the photo-carriers are accelerated by the electric field, and that the recording sensitivity is enhanced by a rise in temperature. A further advantage is that, unlike $WO_3$, moisture (protons) passing in and out of the layer is not required for coloring and elimination. Coloring is caused to occur by movement of ions, such a Li, in the vicinity of the molecules, so that electrons are supplied to the molecules and stirred by light to a state of excitation.

A polycarbonate substrate 90 with a diameter of 120 mm and thickness of 0.6 mm is then attached (affixed) over this organic material layer. Light is then input from the side where this substrate was affixed. The electrochromic material layer is composed of two or three layers. When composed of three layers, these may be formed, for example, from a 70 nanometer layer of IrOx or NiOx (x is an integer less than 1) forming an oxide, a first coloring layer, a 150 nanometer layer of $Ta_2O_5$ forming the solid electrolytic substance layer, and a 100 nanometer layer of $WO_3$, serving as the reducer second coloring layer. When composed of two layers, these two layers may be formed from a 100 nanometer OH ion storage layer composed of $Cr_2O_3$, $Ta_2O_5$, etc., and a 100 nanometer coloring layer formed from $WO_3$. Metal electrodes such as formed from W—Ti may be used instead of the transparent electrode farthest from the light incident side. When the electrochromic material layer is formed by spin-coating, then the groove is buried a little so that the land sections are closer than the group sections in terms of electrode distance on both sides of the recording layer.

When applying a voltage to the transparent electrodes on both sides of a particular recording layer for recording (write) or reading, only that layer is colored, and it absorbs and reflects laser light, so that irradiation with laser light at a wavelength of 660 nanometers allows selective recording (writing) and reading of information.

Figure 5:
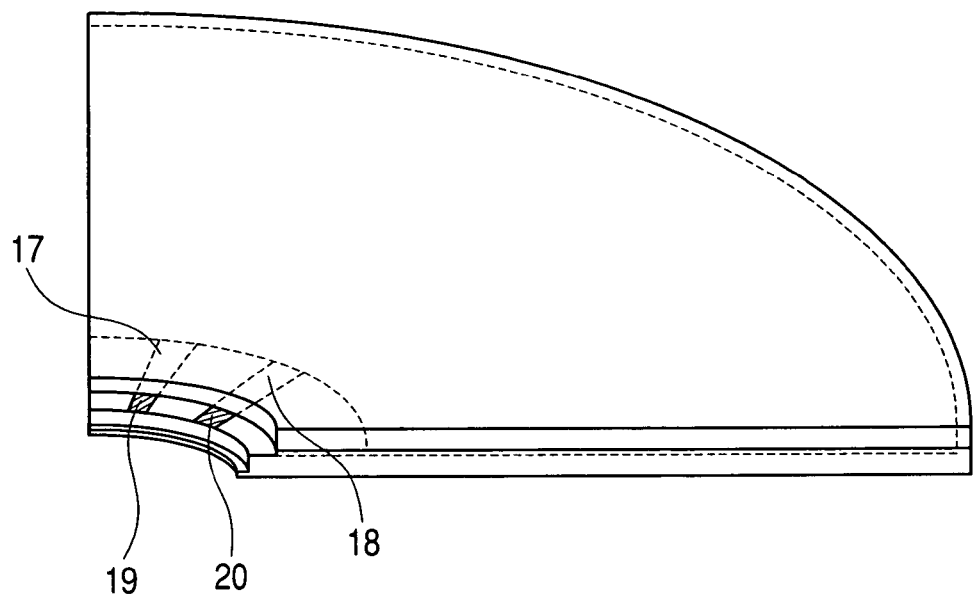
FIG. 5 is a perspective view showing a fragment of the recording medium of the present embodiment.

Electrodes 17 and 18 are installed, respectively, on the innermost circumferential section on the reflective layer electrode and the transparent electrode. As shown in FIG. 5, multiple electrodes 19, 20 are connected near the disk center hole in order to connect to the respectively separate electrodes on the disk-rotating shaft of the record/reproduction device. The disk is installed on the rotating shaft so as to be inverted upside/down from the state shown in the drawing. The disk receiving (bearing) section contains multiple electrodes having a slight up and down spring effect at positions matching the disk electrodes, and these electrodes make contact with each electrode on the disk.

Figure 1:
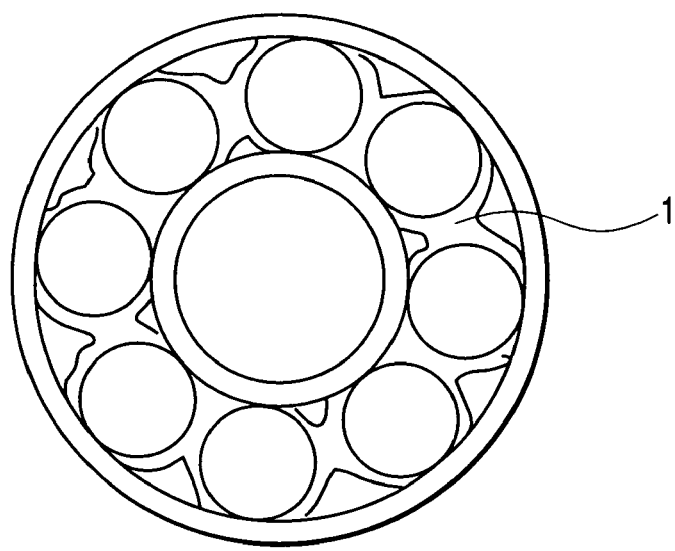
FIG. 1 is a plan view of a ball bearing.
Figure 2:
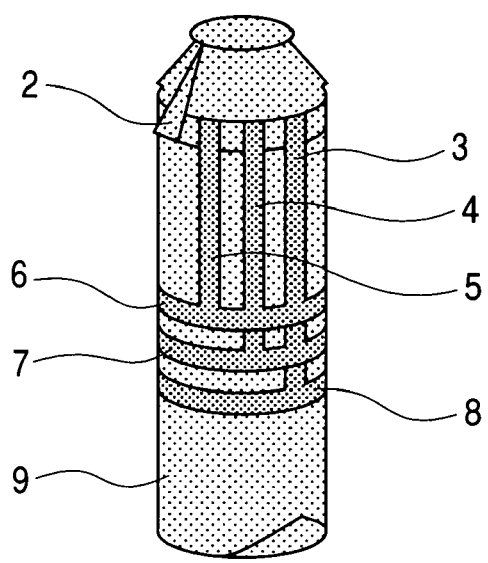
FIG. 2 is a perspective view showing the rotating shaft of the disk motor with ball bearings added.
Figure 3:
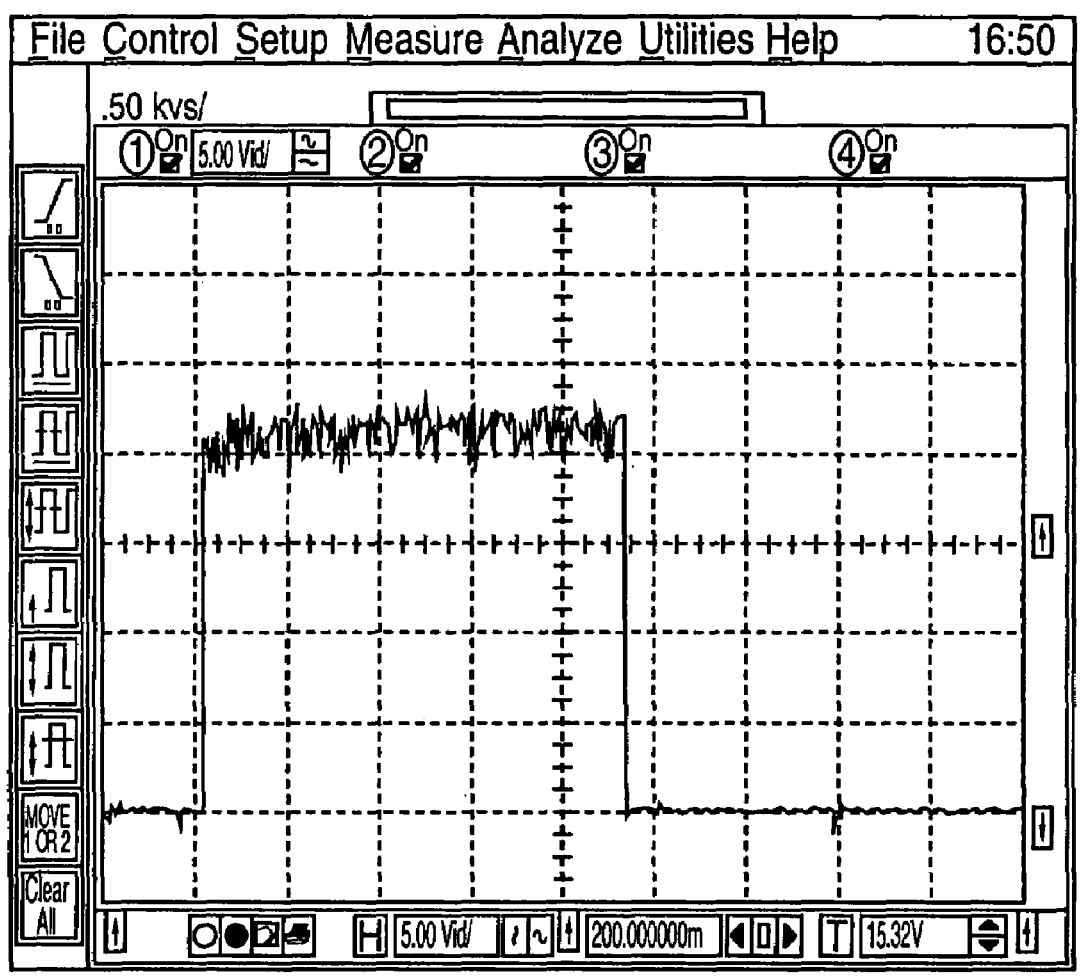
FIG. 3 is a photograph of a display showing voltage transmittance when using ball bearings with electrically conductive grease.
Figure 6:
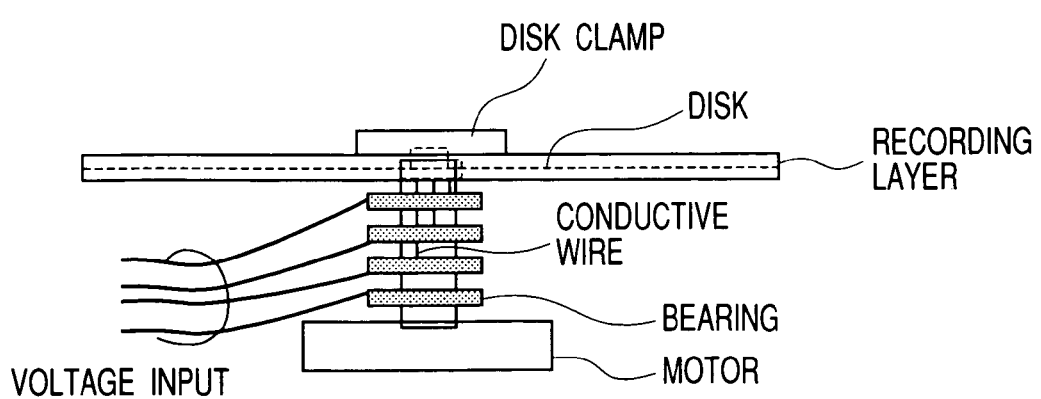
FIG. 6 is a diagram showing the arrangement when a disk has been set on the rotating shaft of the disk motor.
Figure 7:
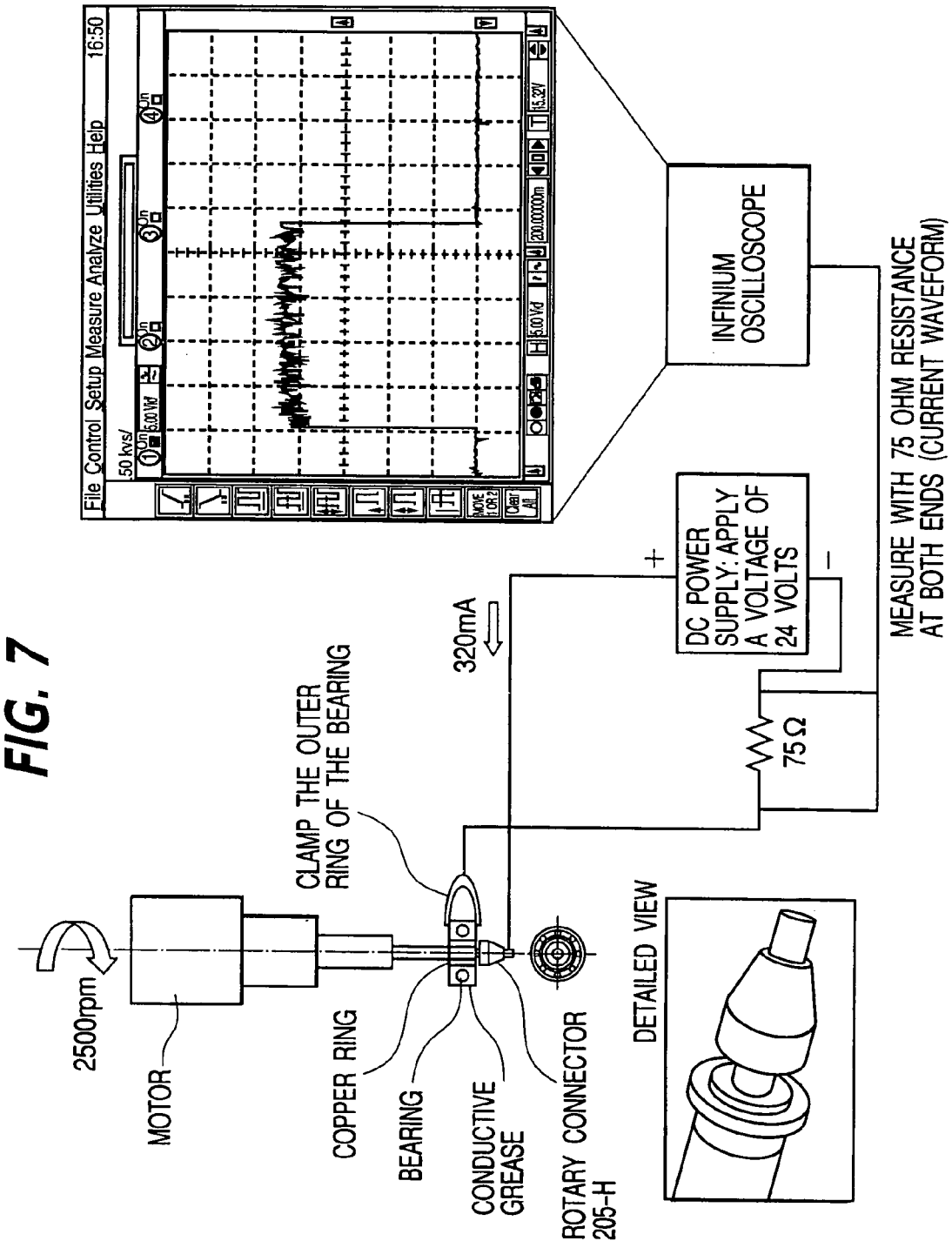
FIG. 7 is a diagram including photographs showing the system for effecting electrical current measurement when using bearings.

As shown in FIG. 6, four ball bearings 22 through 25 are bonded to match up to three layers, in sections at a height where the side surface of the disk is set on the rotating shaft 21 of the motor. As shown in FIG. 1, a hole is formed on the inner race of the ball bearing parallel to the rotating shaft so that an electrical line can pass through. This electrical line connects to a ball bearing below the upper ball bearing. Electrically conductive grease, composed of grease containing carbon, is filled into the periphery of the ball bearing spheres. The state with voltage applied from the ball bearing to the rotating shaft is shown in FIG. 2. As the method for measuring the electrical current in FIG. 7 indicates, the electrical current flows in five millisecond periods somewhat irregularly with fluctuations of approximately 10 percent. However, the recording medium itself functions as a large condenser, so that the actual fluctuation across the electrodes is small and a satisfactory constant voltage is applied.

A protrusion or concavity facing upwards and downwards is formed on a tapered section on one location on the circumference of the rotating shaft. This protrusion or concavity is positioned to engage with a protrusion or concavity at one location on the center hole of the disk, so that the specified (or predetermined) electrodes make contact with each other. In this way, electricity is supplied to the disk from the circuit board of the recording device by way of the ball bearings of the rotating shaft. Applying a positive or negative 12 volts colors or eliminates the color within one second.

(Voltage Application Method)

The pulse power supply has the following specifications.

1. A plus (coloring) and minus (color eliminator) voltage are applied to each layer of the three layer (4 electrode) recording medium. Coloring or color elimination can be selected in each layer (coloring for all layers also possible) and the voltages can be set as plus or as minus.

2. The path between electrodes is electrically open when no voltage is applied (resistance of 1 mega ohm or more as seen from the power supply side).

3. The maximum voltage on both electrodes was set at 20 volts. The accuracy is settable to 0.1 volts.

4. Maximum current was set at 300 milliamperes.

5. The color and color eliminator voltages are applied as pulses after triggering, and they are settable in a pulse width with a range from 0.1 seconds to 1 second, and a pulse interval (period) in a range from 0.1 seconds to 1 second. Pulses can be set in a range from 1 to 100, or they can be set to unlimited repetitions.

6. Even while a positive (plus) voltage is applied to color a new layer to make it color, a positive maintenance voltage can be applied intermittently in sequence (one time from 1 second to 10 seconds in each layer (the period is settable)) to another layer to add or eliminate color (the pulse width is settable in a range from 0.1 to 10 seconds) to maintain a color state or color elimination state.

Plastic (resin) hardened by ultraviolet light is coated onto the film surface of the disk member, and it is affixed to one more substrate sheet to obtain the disk shaped information recording medium.

(Record—Delete—Reproduce)

Figure 8:
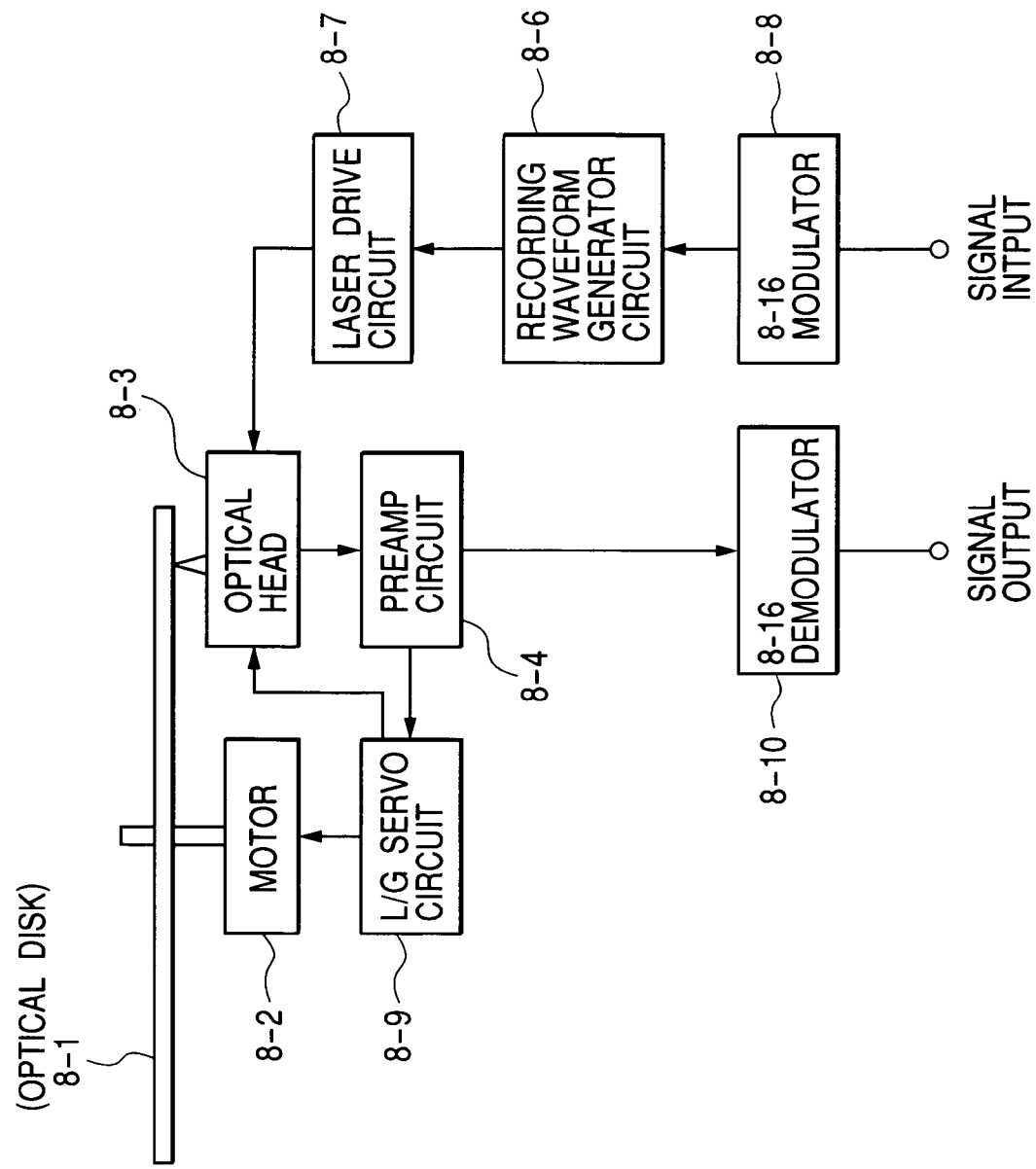
FIG. 8 is a block diagram showing the structure of the recording/reproduction device.

Recording and reproduction of information was performed on the recording medium. The operation for recording and reproducing information will be described next with reference to FIG. 8. The motor control method utilized for performing recording and reproduction is the ZCAV (Zoned Constant Linear Velocity) method in which the disk rotation speed is changed in each zone for recording and reproduction, and it will be described next.

Information from outside the recording device is sent in 8 bit units to the 8-modulator (reference numeral 8-8). Recording was performed by recording information onto the information—recording medium 8-1 (hereafter called an optical disk) by using the so called 8-16 modulation method that converts 8 bit information into 16 bits. This modulation method records the 8 bit information onto the medium as 3T to 14T mark length information corresponding to the 8 bit information. The 8-16 modulator 8-8 performs this modulation. Here, T expresses the clock period during information recording. The disk was made to rotate at a line speed of 15 meters per second relative to the light spot.

The 3T to 14T digital signals modulated by the 8-16 modulator 8-8 are sent to the recording waveform generator circuit 8-6, and a multi-pulse recording waveform is generated.

The 3T to 14T digital signals are alternately made to correspond to "0" or "1" along a time axis within the recording waveform generator circuit. The recording waveform generator circuit 8-6 contains a multi-pulse waveform table corresponding to a method (adaptive type waveform recording control) for varying the pulse width of the lead (beginning) pulse and final pulse, during forming of the high power pulse string for forming the mark section in the recording waveform generator circuit 8-6. In this way, multiple recording waveforms can be formed with the effects of heat generated between marks reduced drastically eliminated.

The recording waveforms formed in the recording waveform generator circuit 8-6 are sent to the laser drive circuit 8-7. The laser drive circuit emits a semiconductor laser beam from within the optical head 8-3 based on this recording waveform.

The optical head 8-3 mounted in this recording device uses light from a semiconductor laser having a light wavelength of 660 nanometers as the information recording laser beam. This laser beam is focused onto the recording layer of the optical disk 8-1 by an objective lens of NA 0.65, and the laser beam irradiated onto that layer operates to record the information.

By making use of this recording principle, recording can easily be performed on the same or a separate recording track by forming multiple light spots from a single optical head or from multiple optical heads. This recording device may use a method (anomalous version of the so-called in-groove recording method) for recording information on lands from among grooves and lands.

The optical head was also utilized for reproduction (or playback) of recorded information. A reproduction (play/read) signal is obtained by applying a voltage to a specified layer to generate color, and then a laser beam is irradiated onto the recorded mark and the light reflected from the mark and sections other than the mark are detected. The color lost by the color function due to irradiation of the mark section with a laser beam is thin so that a reproduction (play) signal can be obtained. In the present embodiment, the chemical bond of the polythiophene which is used as the electrochromic material is cleaved in localized sections due to irradiation by the laser beam and coloration may become difficult due to the molecular quantity becoming small. When an ion pass control layer is added to control the movement of ions between the electrochromic material layer and the solid electrolytic material, this ion passage control layer will prevent the passage of ions, such as Li, that are generated by laser beam irradiation, so that coloration can also be prevented. Either organic material or inorganic material may be utilized as the ion passage control layer. Here, a combination of $In_2O_3$ and Zn low oxidation compound $ZnO_x$ (x is larger than 0.5 and smaller than 0.9) inorganic material, for example, may be utilized as the inorganic material. The $In_2O_3$ material contains a relatively large crystal lattice, so that the Li ions can easily pass through. However, irradiation by the laser beam causes the Zn to diffuse and accumulate (block up) inside the $In_2O_3$, so as to restrict the passage of Li ions. This process also promotes intercalation due to the temperature rise. The $In_2O_3$ material forms a satisfactory transparent electrode when $SnO_2$ is added from 2 to 10 percent mol. This layer is therefore considered to function like the grid on a vacuum tube, being capable of also stimulating or suppressing the flow of ions by application of a voltage. Conversely, however, recording is also possible by making the color denser (more concentrated). In this case though, the color on the mark sections must be removed during application of a reverse voltage so as to prevent interference with recording or reproduction onto adjacent layers.

A preamp circuit increases the amplitude of this reproduction (play) signal and the 8-16 demodulator 801 converts every 16 bits into 8 bit information. The operation for reproducing the recorded mark is now completed.

After recording the mark edge under the above conditions, the mark length of the 3T mark forming the shortest mark is approximately 0.20 micrometers. The mark length of the 14T mark forming the longest mark is approximately 1.96 micrometers. The recording signal contains timing data for the repeated 4T mark and 4T spaces at the start edge and finish edge of the information signal. The start edge also contains a VFO.

(Mark Edge Recording)

High density recording is achieved by employing the mark edge recording method. The mark edge recording method is a method that makes a digital data 1 match both edges of the recording marks formed on the recording film. In this way, the length of the shortest recording marks are made to correspond to not one, but to 2 or 3 reference clocks, and, therefore, they are capable of high density recording.

(Transparent Electrode)

The following material may be used for the transparent electrodes. This material is composed of $(In_2O_3) \times (SnO_2)$ 1-x. Here, x is a material in a range from 5 percent to 99 percent, and, more preferably, x is from 90 percent to 98 percent in view of the resistance value. Transparent electrode material, such as $SiO_2$, added to the above mentioned material at 50 percent or less in mol percent, oxidized compounds, such as $Sb_2O_3$, added to the $SnO_2$ from 2 to 5 percent in mol percent, as well as electrically conductive organic material, such as the polyacethylene or polythiophene described in detail in connection with the second embodiment, may also be used.

(Substrate)

The present embodiment utilizes a polycarbonate substrate 77 containing tracking grooves directly on the surface. However, a substrate containing tracking grooves is a substrate that contains grooves with a depth of (lambda) $\lambda/15n$ or deeper (n is the refraction index of the substrate material) when the recording-reproduction wavelength along a portion or the entire substrate surface is set as $\lambda$(lambda). The grooves may be consecutively formed on one circumference (circle), or they may be segmented along the circle. The balance between tracking and noise was found to be favorable when the groove depth was set to approximately (lambda)$\lambda/12n$. The groove width may also differ according to location. The substrate may be formatted for recording and reproduction on both groove and land sections, or the substrate format may perform recording on either section. On types that record only groups, the tracking pitch has a pitch wavelength/focusing lens NA in the vicinity of 0.7 times, and the group width is in ½ of that vicinity.

When the laser light source utilizes, for example, a four-element array laser, the data transfer speed can be increased to a high speed of about four times the original speed.

The voltage applied need not always be limited to only one recording layer, and the voltage may be applied across multiple electrodes when simultaneously recording on multiple recording layers. Also, if the voltage across the electrodes on recording layers not used for recording is set to a finite value and not zero, then delay time for the coloring can be prevented due to the response speed of the material for coloring and the capacity across the electrodes. Further, when removing a voltage to eliminate color, the time required to eliminate the color can be reduced to one-half by applying a reverse voltage.

Properties for recording, such as eliminating the electrochromic function of the film, providing no coloring even when a voltage is applied, or having an absorption spectrum different from that prior to recording, can be imparted by the effect obtained by applying laser light and/or an electrical current. The optical film thickness is preferably made to have a read-out wavelength of about 1 wavelength portion from transparent electrode to transparent electrode, because all of the recording wavelengths will then have an equal optical value.

Multiple layers may be made to colors simultaneous with the application of a voltage to multiple layers, or when sequentially performing recording and/or reproducing. The thickness from each layer of a transparent electrode to another transparent electrode may be set to a depth approximately that of the focus lens focal point depth, and by effecting coloring so that the optical absorption coefficient becomes larger the farther inside the layer, a satisfactory state can be achieved for high precision recording along the depth of the focal point position. Also, making the thickness of each layer slightly thinner will prove advantageous for recording volume holograms, etc. Setting the optical absorption coefficient of each layer to about the same value and making the film thin, using high power beam irradiation to deeper layers, and using lower power beam irradiation at layers near the beam input side, will allow recording of multiple recording values.

The time required for coloring and eliminating colors can be shortened if all the layers are divided into a number of groups. For example, in the present embodiment, the four layers are divided into groups of two layers each, and electrochromic layers of the same group are made to simultaneously color or de-color. Favorable recording characteristics can be obtained if the voltage or the degree of dilution, such as of acrylic polymers of the electrochromic material within the same group, are adjusted so that the light absorption ratio becomes higher the farther the layer is from the light input side.

Another method that is effective in preventing the time required for coloring or eliminating colors to become a factor in limiting the recording/reproduction speed is to color sequentially as seen from the light input side to the deep layers, and to sequentially eliminate colors in order from the closer layer. Implementing this method makes it possible to start application of a voltage to layers adjacent to the one layer coloring and, therefore, prepares the layers for coloring to speed up the process.

The multiple layers may all be within the focal point depth of the focusing lens, however, the focal position may be changed by enclosing every certain number of layers (for example, every three layers) with spacer layers having a thickness of 20 to 40 microns and then recording/reproducing on each layer. In this case, an element to correct for spherical aberrations should be installed in the optical system when using spacer layers every two or more layers.

If slip rings are used to make contact in small areas, rather than the usual ball bearings spanning the entire circumference, as in the present embodiment, then the durability will greatly decline due to abrasion (wear), but the slip rings may be usable according to the particular application. In the case of slip rings, if the rings on the rotating shaft side are split up into multiple arcs (for example four pieces), the area between each arc is insulated, and multiple spring material electrodes (for example four pieces) are installed to make contact, then voltage can be supplied to the four transparent electrodes on one ring. A voltage must be supplied across the two electrodes on the opposite side, so two of the same rings are positioned vertically (up/down) on the rotating shaft, and wires connected between the arcs matching the vertical rings and wires are then connected to each disk electrode. The position of the spring-electrode was here shifted at the vertically adjacent slip rings by one arc and a voltage is always applied across the opposite electrodes. Applying a voltage to just one pair of electrodes ensures that a voltage pulse is applied only when the spring material electrode has arrived on the arc. The durability is improved if a ball holder is installed on the tip of the spring material electrode to hold one or only a few balls or rod members as a ball bearing for rolling friction.

Second Embodiment

Figure 9:
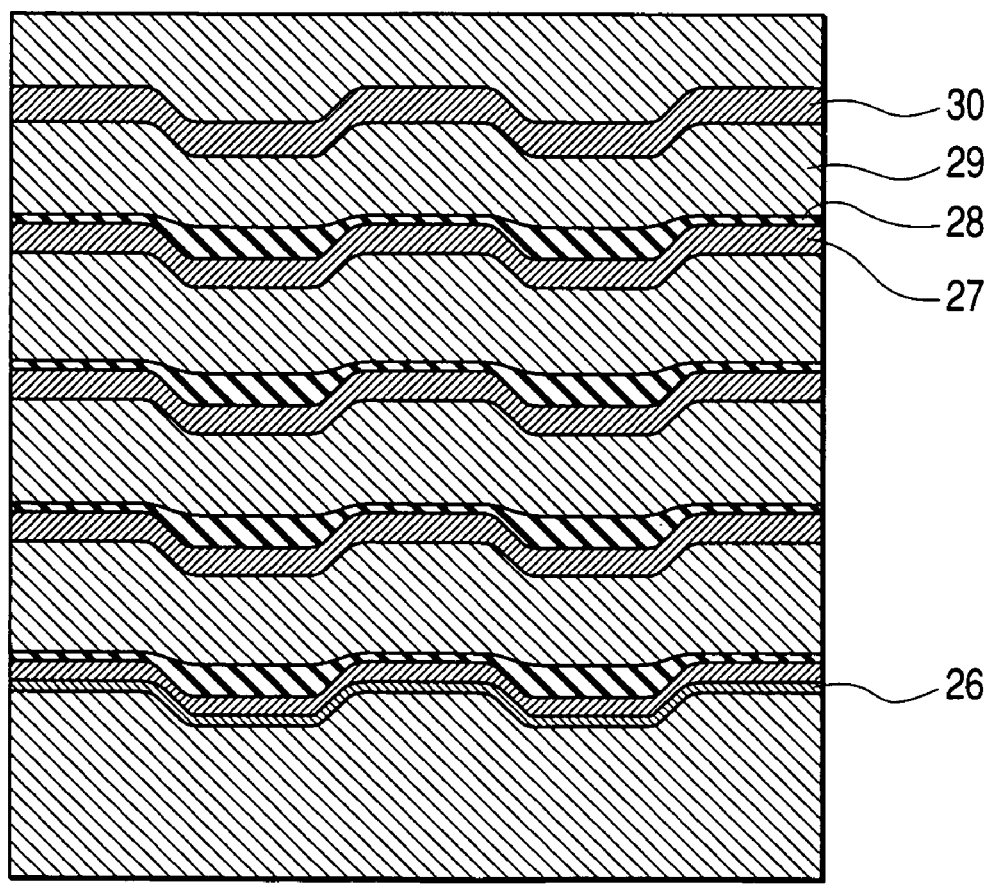
FIG. 9 is a cross sectional view showing the structure of the recording medium of the present embodiment.

A read-only memory (ROM) medium is utilized in the device structure, as the recording medium, the same as in the first embodiment. A cross section of the structure is shown in FIG. 9. The electrochromic material (polydioxenethiophene) layer 28 is formed on a substrate with the information formed by pits, with the layer being thick inside the pits and thin outside the pits so that color can be produced just within the pit during application of a voltage. An ultraviolet hardened plastic mixed in an electrolytic substance layer 29 is formed over this layer (28), so that by pressing with a stamper and passing it through heated rollers at 140 degrees centigrade, concavities and protrusions can be formed on the surface and these can later be hardened. Each layer has a different bit array (arrangement); however, for the purposes of simplicity patterns with the same irregularities (concavities/protrusions) are shown in the figure. Color is produced only in the bit of the layer where the voltage is applied, so that read-out can be performed selectively. The medium of each layer may be formed as recordable mediums, such a ROM recording medium and the medium of the first embodiment.

Multilayer disks, such as the possessing a combination of -ROM and -R, have ROM layers completely identical to a single layer ROM and can therefore be readout on many devices. Further, a user possessing devices capable of recording can also search a ROM layer during recording on recordable -R layers, so that these multilayer disks have extremely large advantages as recording mediums. The -R recording layers may consist of inorganic material or organic material, and a typical example of organic material is a polythiophenic type material. The solid electrolytic material utilized is a combination of layers containing lithium trifluorate and acrylic resin.

Third Embodiment

Figure 10:
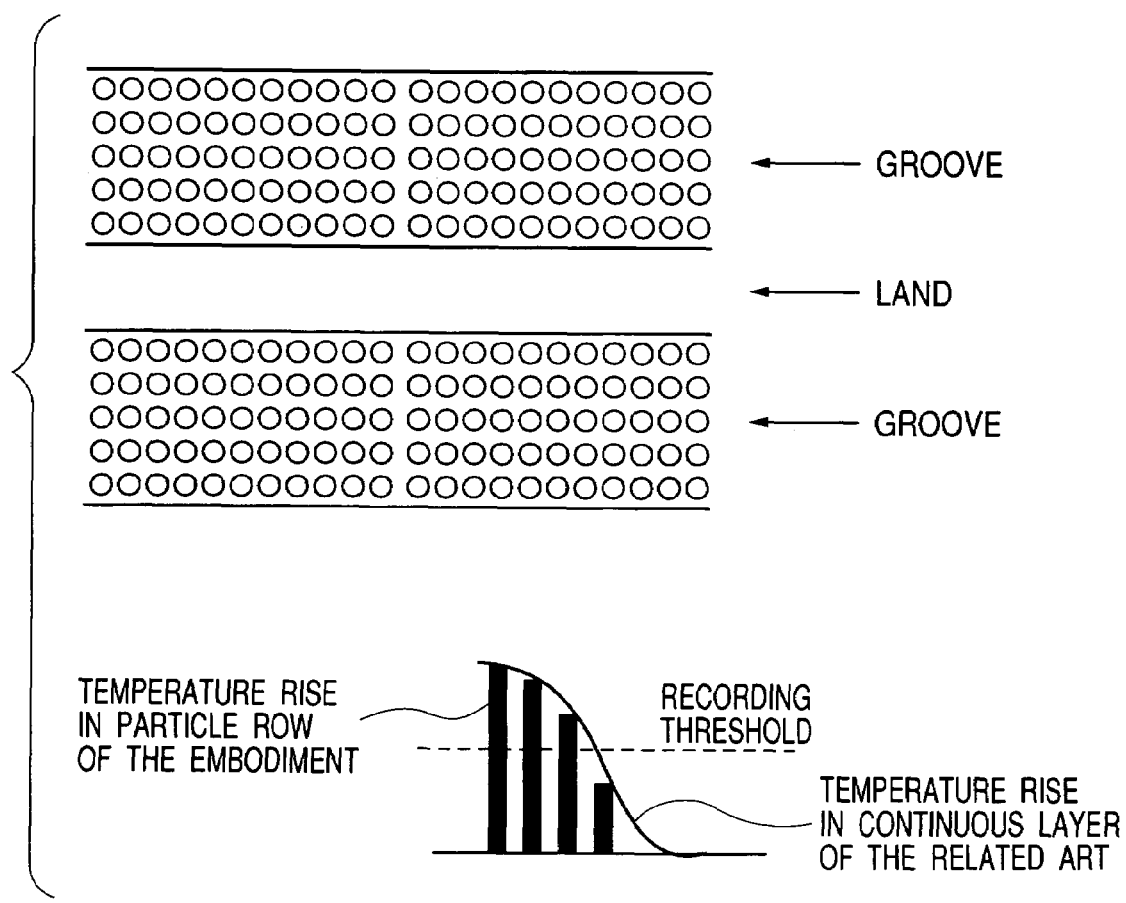
FIG. 10 is a diagram showing the composition of the recording medium of the present embodiment.

The recording medium of the present embodiment has the structure shown in FIG. 10. This medium was fabricated by the following method. First of all, a groove 31 was formed along the recording track in the same way as the optical track by depositing ultraviolet hardened plastic on a glass substrate of a 2.5 inch magnetic disk. Aluminum electrodes were formed to a film thickness of 50 nanometers. Next, polyethyleneimine melted in chloroform was coated thereon and dried, as in the magnetic disk fabrication method described in the paper in J. Am. Chem. Soc. vol. 124, No. 12, p2884 (2002) by Shouheng Sun and others. The polyethyleneimine thinly attached to the land sections was then stripped away with plasma asher. The polyethyleneimine was at this time remained on the group sections. Next, large numbers of particles 32 with a 15 nanometer diameter of Pt50Fe50 alloy with oleylamine and oleic acid particles attached to the periphery were dispersed in hekisane and coated thereon. Then, particles not attached to the polyethyleneimine were washed away with hekisane and dried. The above-mentioned grooves are formed continuously along the circumference as normally shown in FIG. 10, however these may continue intermittently every 330 nanometers. Sections not forming grooves of approximately 50 nanometers are present. Pt—Fe particles clog up in each section of these grooves in prescribed patterns at 30 nanometer periods and form the arrays shown in FIG. 10. The Pt—Fe particles with oleylamine and oleic acid particles attached to the periphery were produced by the same method as utilized for the magnetic disk described in connection the first embodiment of JP-A No. 54012/2000. Electrodes may be formed from magnetic material instead of aluminum. The forming of the film was performed by magnetron sputtering.

Pt—Co is preferably used as the material instead of Pt—Fe. The process can be performed in the same way using PVP (polyvinylpyrodiline) instead of polyethyleneimine.

In the present embodiment, the polyethyleneimine on the land sections was stripped away. However, Pt—Fe particles may be attached, forming self-formed structures even on lands that were remaining.

Besides the method of providing self-formed layers of the present invention that coat the substrate and then dipping it in fluid, these may be formed by the LB (Langmuir Blodgett) method that forms them scooping them from the surface of the fluid. However, the larger the surface area of the recording region, the more difficult it is to make a self-formed structure of the entire piece. Methods are used to align the orientation of the magnetic field of the particles, such as of Pt—Fe, by heating, while applying a strong, magnetic field.

In the recording medium of the present embodiment, a voltage is supplied by way of ball bearings in the rotating shaft as in the first embodiment and the voltage is connected to aluminum electrodes. When a voltage is applied to the aluminum electrodes during recording or reproduction, the recording or reproduction is usually performed by the MR head. However, tunnel current can flow by way of gaps in the head medium between the head electrode and the aluminum electrodes, and recording can be performed at high density by supplementing with localized heat. If the head is a head using the probe method, then an even more precise servo action is possible and recording/reproduction per each individual particle is possible.

In the magnetic recording medium of the present embodiment, applying a voltage across the magnetic recording layer and aluminum electrode layer heats up the magnetic particles arrayed in concavities (or recesses) in grooves on the substrate and assists the recording. Substantial current heating can be obtained by forming a thin (thickness 15 nm) aluminum electrode layer over the recording layer and applying a voltage across aluminum electrode layers. When the organic material in the periphery of the magnetic particles is made of an electrically conductive magnetic material, the electrical conductance will increase as the temperature is raised. The temperature in the section near the magnetic recording head will therefore rise due to heat generated by the magnetic head itself, or the heat generated by the heater installed in the magnetic head. This heat causes the conductivity to rise and increases the generated heat even further. Therefore, intense heat is emitted only by the magnetic particles in the section near the recording head, whereby accurate high precision recording can be achieved.

In the magnetic recording medium described above, the recording layer is a continuous thin film medium and irregularities (protrusions/concavities) corresponding to the recording bits on the substrate can be formed on the surface of the substrate by transfer from the stamper, and high density recording is achieved. When layers are stacked (laminated) in the order of: electrode—coated conductive material layer—magnetic recording layer, then joule heat is generated only in the protrusions of irregularities where the distance between electrodes is short and accurate, and high density recording can be achieved. In this case, a typical layer structure is: glass substrate, irregularity replica layer, aluminum electrode layer, coated conductive material layer, magnetic recording layer and lubricant layer; and, when a voltage is applied across the aluminum electrode layer and magnetic recording layer, the protrusions on the conductive magnetic material layer generate heat, which enhances the recording in tiny magnetic sections. The electrical conductance of the coated conductive material layer will increase as the temperature rises even in organic conductive material, such as polydioxythiophene, and even in inorganic material, such as silicon. The temperature will therefore rise when the magnetic head itself generates heat in the section near the magnetic head, or from heating due to heat generated by the heater installed in the recording head, and further heat is generated as the conductance increases. Intense heat is therefore generated only in the substrate protrusions in sections near the recording head, and accurate, high precision recording can be achieved.

Whether the recording medium of the present embodiment uses an optical recording medium or uses an optical assist magnetic recording medium (magnetic-optical hybrid recording medium), the recording area with magnetic particles facing in one direction will faithfully reproduce the signals for recording, and the medium will possess superb characteristics. A method, such as heating while applying a strong magnetic field, is used to align the orientation of the particles, such as Pt—Fe, along the magnetic field axis. Plasmon excitation resonance absorption from irradiation of the light has the effect of easily reversing the magnetism of even weak external magnetic fields. An electromagnet for applying a magnetic field and the optical (magnetic) head already well known in the conventional art are used for optical-magnetic recording. A magnetic head having a light-converging optical system and a coil are utilized for recording during optical-assist magnetic recording, and a GMR magnetic head is utilized during read-out. In these cases, a Pt—Co alloy, such as $Pt_{50}Co_{50}$, was used for the tiny particle structure and was found preferable for easily aligning the magnetic field axis while heating during application of the magnetic field.

The present embodiment is identical to the first embodiment in that the applied voltage may also be applied as pulses and that the bearings can be changed to slip rings, etc. A method is known for releasing static electricity from the magnetic flow seal on the magnetic disk. However, electrically isolating the magnetic flow seal from the rotating shaft of the motor and main unit is difficult, while the method of the present invention for applying a voltage during recording/reproduction is ideal.

Fourth Embodiment

Figure 11:
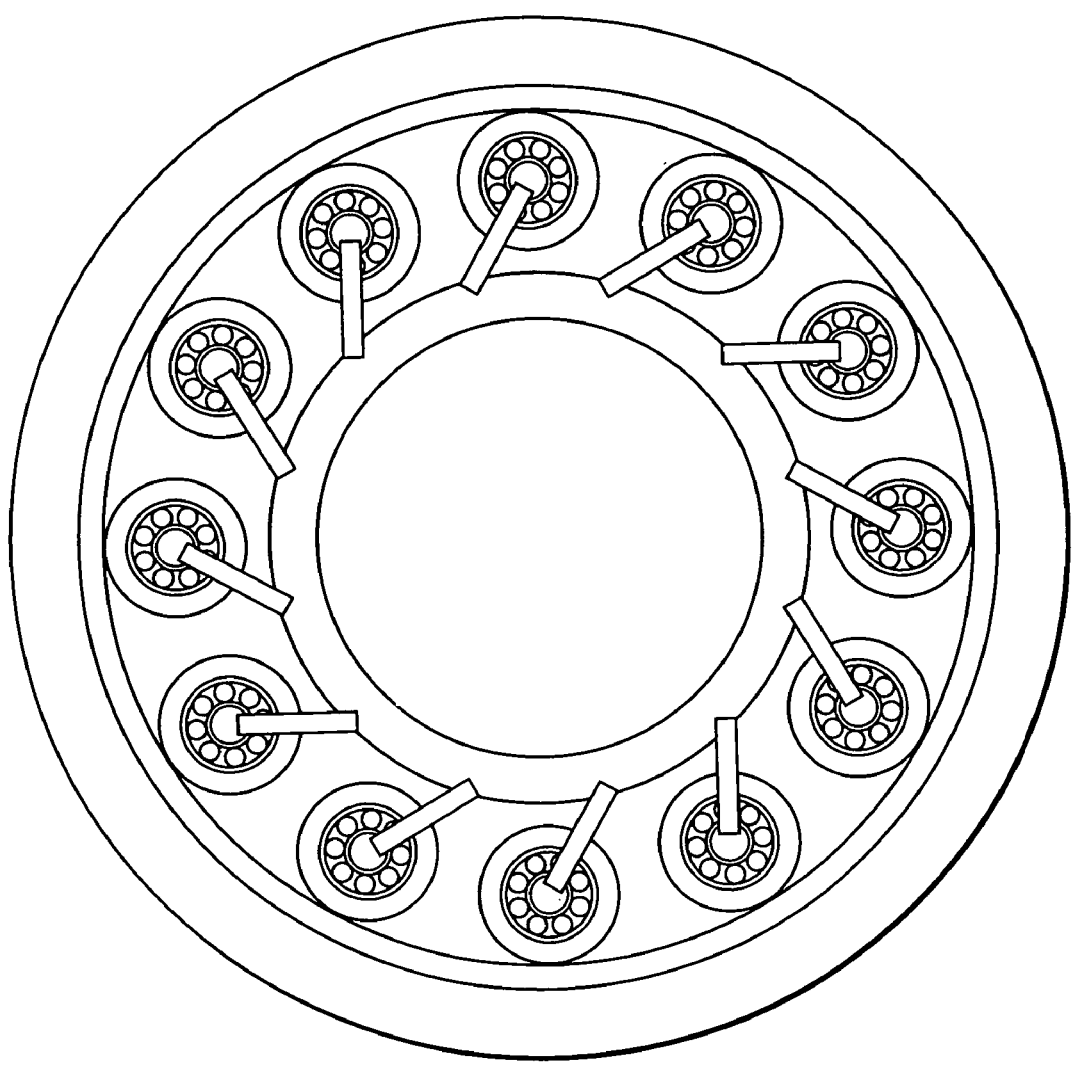
FIG. 11 is a top plan view showing a wheel-type voltage transmission mechanism.

The present embodiment is identical to the first embodiment except for the fact that a wheel-type voltage transmission mechanism is utilized instead of the ball bearings of the first embodiment. As shown in FIG. 11, twelve circular wheels 32 are installed at equally spaced intervals inside an inner ring 31 fit into the rotating shaft, and the inner ring and wheels have mutually fixed positions. Twelve wires are installed facing the recording medium on the external side of the rotating shaft to correspond to each wheel and these wires conduct electrical current through these wheels. The outer wheel 33 makes contact with the road surface so that the positional relationship of the circular wheels and the outer wheel changes as the rotating shaft turns. The inner wall of the outer wheel is segmented into twelve equally spaced arc-shaped conductive elements mutually insulated along the circumference. Insulation is achieved by twelve arc-shaped ceramic components.

Each of the arc-shaped conductive elements is connected to a wire so that a voltage can be applied. If a fixed voltage is applied, a voltage is sequentially applied intermittently to the wires on the rotating shaft. A color-elimination state can be maintained in this way. To apply a coloring voltage at intervals to a pair of electrodes on the rotating shaft, a positive voltage is constantly applied to specified wheels in synchronization with the movement of the circular wheels versus the outer wheels, and the voltage applied to the twelve arc pieces is switched so that a negative voltage is constantly applied to the specified wheels. Super-small ball bearings may be installed at the center of the wheels, as shown in FIG. 11, and a section of the wheels that are made finer and balls or round rods may be installed for support on the outer side of this section. These balls or rods are fit into a ring-shaped frame on the outer side. In these cases, there is no worry of electrically conductive grease spreading out and conducting (shorting) between electrodes, even if it is used in the rotating sections of each wheel. An electrically conductive magnetic flow seal may also be used in the center of the wheel. Using a magnetic flow seal makes it possible to reduce abrasion (wear) to a minimum. Using this seal yields the advantages that the entire piece can be made to thin dimensions and to easily conduct electricity even if no electrically conductive grease is used.

[Patent Document 2] JP-A No. 54012/2000
[Non-Patent Document 1] J. Am. chem. Soc. vol. 124, No. 12, p2884 (2002)

What is claimed is:

1. An information recording apparatus comprising:
    a rotating shaft;
    multiple rolling components installed on the outer circumference of the rotating shaft;
    a power supply to respectively supply an electrical current to said multiple rolling components; and
    means to supply an electrical current to each recording layer formed on a disk from the respective multiple rolling components.

2. An information recording apparatus according to claim 1, wherein said means for supplying an electrical current supplies an electrical current to a specified combination among the multiple rolling components.

3. An information recording apparatus according to claim 1, wherein a positioning means for setting a position relative to the medium is installed on the rotating shaft.

4. An information recording apparatus according to claim 1, wherein the multiple rolling components are slip rings or ball bearings.

5. An information recording apparatus according to claim 1, wherein the multiple rolling components are ball bearings containing electrically conductive grease material.

6. An information recording method, comprising the steps of:
    supplying an electrical current to a first recording layer selected from multiple recording layers of a medium through a rotating shaft by way of the rolling components installed on the periphery of the rotating shaft; and
    recording Information on the first recording layer.

7. An information recording method according to claim 6 with multiple rolling components, wherein
an electrical current is supplied to the first recording layer by a first pair of rolling components from among said multiple rolling components, and
after recording information on the first recording layer, electrical current is supplied to a second pair of rolling components and information is recorded on a second recording layer.

8. An information recording method according to claim 6, wherein the supply of electrical current is performed by a specific combination of pairs of components from among the multiple pairs of rolling components.

9. An information recording method according to claim 6, wherein the medium is a combination of ROM types and R types.

10. An information recording method according to claim 6, wherein the medium is a ROM type, and color is generated selectively within a pit therein when a coloring voltage is applied thereto.

11. An information recording method according to claim 6, wherein the recording film of the medium is a magnetic film.

12. An information recording method according to claim 6, wherein the medium is formed in multiple layers, each layer being formed as a set comprising a first electrode, an electrochromic recording layer and a second electrode; and the transmittance ratio of the electrochromic recording layer is varied by applying a voltage to the first and the second electrodes of a set.

13. An information recording apparatus comprising:
a rotating shaft;
a plurality of rotatable voltage transmission components installed on an outer circumference of the rotating shaft;
a power supply for supplying an electric current to each of the rotatable voltage transmission components; and
means for supplying the electric current from the plurality of rotatable voltage transmission to each recording layer formed on a disk.

14. The information recording apparatus of claim 13, wherein each of the plurality of rotatable voltage transmission components comprises:
a ball bearing assembly including an inner race, an outer race, and a plurality of ball bearings;
the inner race including a hole formed in its center for receiving the rotating shaft therethrough; and
electrically conductive filling a space between the inner race and the outer race.

15. The information recording apparatus of claim 13, wherein the rotatable voltage transmission components are configured as respective wheel-type transmission mechanisms.

16. The information recording apparatus of claim 15, wherein each wheel-type transmission mechanism comprises:
an inner ring and an outer ring, the inner ring including a hole formed in its center for receiving the rotating shaft therethrough; and
a plurality of circular wheels positioned within the inner ring.

17. The information recording apparatus of claim 16, wherein each circular wheel includes a plurality of super-small ball bearings disposed in the center thereof.

18. The information recording apparatus of claim 16, wherein each wheel includes a rod disposed in the center thereof to allow rotation of said wheel.

* * * * *